June 14, 1960

V. MILENKOVIC ET AL 2,940,563

DRIVE AND BRAKE

Filed Aug. 9, 1957

INVENTOR.
VELJKO MILENKOVIC
JONAS STURAS
BY CLAYTON DUBOSQUE, JR.

ATTORNEY

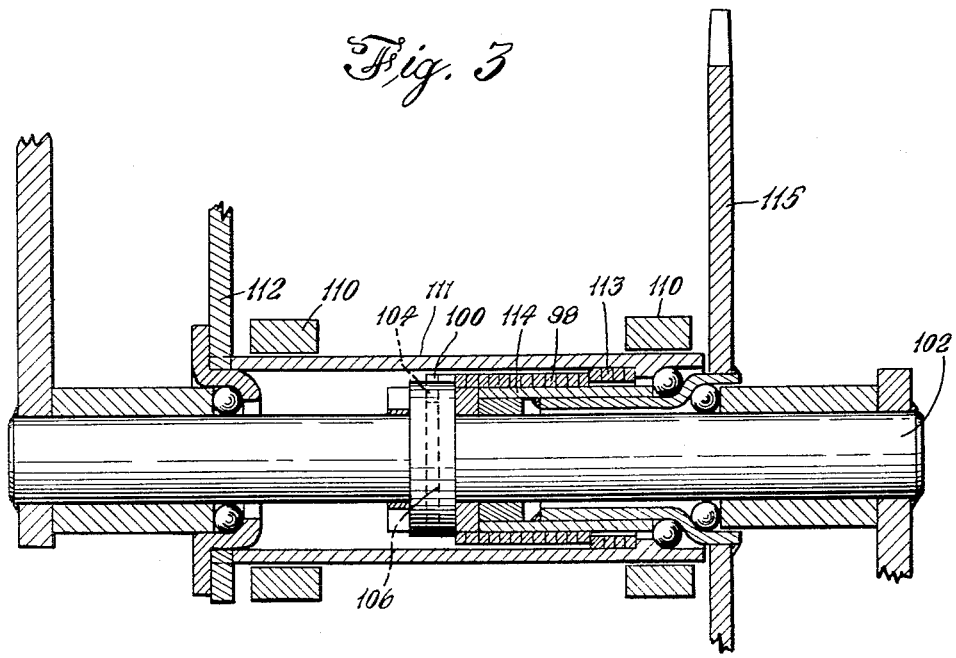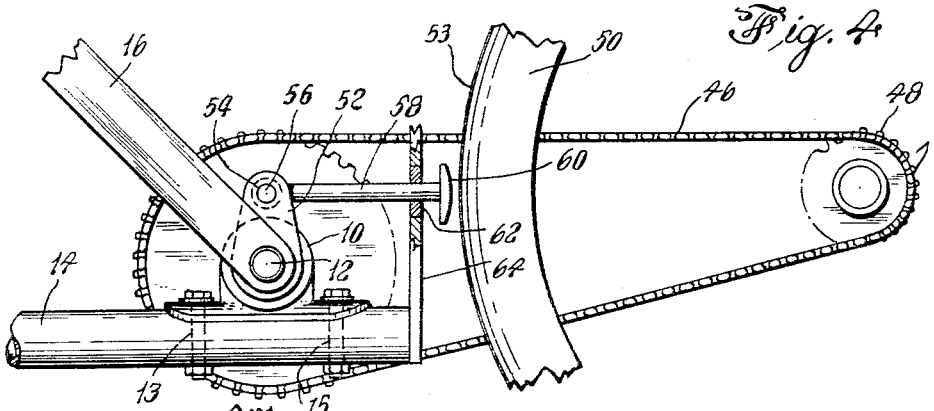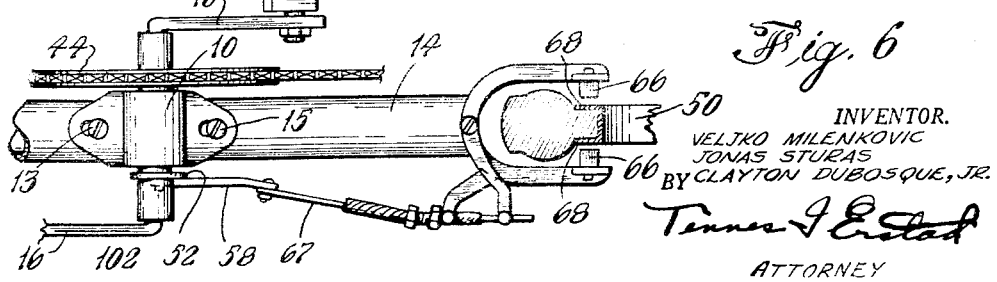

2,940,563
Patented June 14, 1960

2,940,563
DRIVE AND BRAKE

Veljko Milenkovic and Jonas Sturas, Chicago, Ill., and Clayton Dubosque, Jr., New Canaan, Conn., assignors to American Machine and Foundry Company, a corporation Filed Aug. 9, 1957, Ser. No. 677,272

14 Claims. (Cl. 192—5)

This invention relates to drives and brakes, and more particularly to drives and brakes for pedal operated cycles.

Pedal operated drives and brakes currently used on bicycles have usually been of the coaster type and have many components requiring adjustment from time to time to provide smooth operation. This type of coaster brake depends upon sprocket chains to transmit the braking force, which has the disadvantage in the event the chain breaks or becomes detached that it would be impossible to apply the brake.

It is, therefore, an object of this invention to provide a simplified drive which has few components, is easily assembled, and reliable in operation.

A further object is to provide a drive which will have incorporated therein a brake control.

A further object is to provide a drive and brake mechanism which can be mounted within the crank hanger of a bicycle frame as well as within a wheel hub.

A further object of this invention is to provide such a drive and brake device that requires no adjustment after it has once been assembled.

A further object of this invention is to provide such a device wherein a broken or detached sprocket chain would not interfere with the application of the brake by a cyclist.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Fig. 3 is a longitudinal sectional view of still another embodiment of our invention employing a single drive spring.

Fig. 4 is a side sectional view of the braking action that may be used in cooperation with the embodiments shown in Figs. 1 and 2.

Fig. 6 is a plan view of the caliper braking action that may be used with our improved brake actuator.

Figure 1:
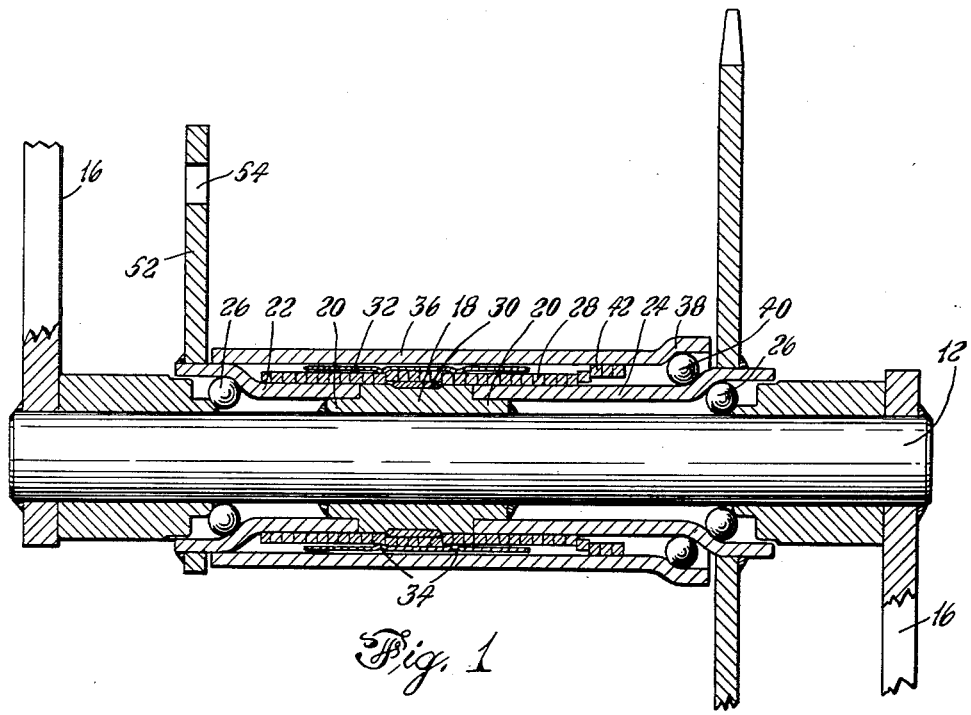
Figure 1 is a longitudinal sectional view of an embodiment of our invention, employing a single spring for driving and for actuating a brake.

The crank hanger 10 may be attached to the lower portion of a bicycle frame 14 in any suitable manner such as by welding or by bolts 13 and 15, shown in Fig. 4. A rotatably mounted, pedal operated crankshaft 12 is positioned through the crank hanger 10 and has a pair of pedal arms 16 integral therewith so that they may rotate the crankshaft 12. The center of the crankshaft 12 has a raised portion 18 with shoulders 20 at both ends of that raised portion to support and hold in axial alignment a brake sleeve 22 at one end, and a drive sleeve 24 at spaced points on the crankshaft 12.

Ball bearings 26 are positioned at the outer ends of those sleeves and on the crankshaft 12 to support the free rotation of the drive sleeve 24 and the brake sleeve 22.

In the embodiment of our invention shown in Fig. 1, we have employed a single square wire, helical, right hand wound, coil spring 28. This spring 28 is mounted over and fixed to the raised portion 18 of shaft 12 at its center. One side of the spring 28 is mounted around the brake sleeve 22 to have a prehensile grasp thereon when rotated in one direction. The other side of the spring 28 is mounted over the drive sleeve 24 to have a prehensile grip thereon when rotated in the opposite direction. The inside diameter of said coil spring 28 is made slightly smaller than the outside diameter of sleeves 22 and 24, resulting in a snug fit of said spring 28 on said sleeves 22 and 24.

The center of the raised portion 18 on the crankshaft 12 has a portion raised slightly by knurling 30. This knurled portion 30 causes the coil spring 28 to enlarge its diameter where it encircles said knurled portion 30 to thereby cause it to firmly grip member 18 of the drive shaft 12.

In operation all torque exerted on the spring originate from the central raised portion of the crankshaft, and is transmitted to the central internal surface of the coil spring, and the direction the spring is caused to rotate depends on the direction the crank shaft 12 is rotated.

A sleeve tube 32 having two circumferential crimps 34 is positioned between the coil spring 28 and a stationary bearing tube 36 rigidly mounted within a suitable crank hanger 10 of the bicycle frame 14. The sleeve 32 confines that portion of the spring 28 over which it extends, and firmly secures the center portion of spring 28 to the knurling 30 of raised portion 18 to prevent any slippage therebetween. When the spring 28 is rotated its prehensile grasp will cause either the sleeve 22 or the sleeve 24 to be rotated.

The stationary bearing tube 36 has a raised portion 38 at the drive end of said tube 36 to accommodate a roller bearing 40 which provides for the free rotation of the drive sleeve 24 in axial alignment with the brake sleeve 22 on which the other end of tube 36 is rotated.

The diameter of a few end coils 42 of the coil spring 28 at the drive end of said spring 28 is expanded to allow their outer surfaces to frictionally engage the inner wall of the stationary bearing tube 36 so that when the rider back-pedals or when the rider coasts this will assist in effecting a release of the springs prehensile grasp on the drive sleeve 24.

A sprocket wheel 44 is fixedly connected to the drive sleeve 24 in any suitable manner such as by welding or shrinking. A suitable endless sprocket chain 46 travels over said sprocket wheel 44 and over a sprocket wheel 48 located at the hub of the rear wheel 50, transmitting driving force to said rear wheel 50.

Figs. 1 and 4 illustrate how the brake lever 52 may be used to apply braking force directly to the rear tire 53 by means of a rod 58. The crank hanger 10, suitably attached to the lower portion of the bicycle frame 14, contains the crankshaft. A brake lever 52 is suitably attached to the brake sleeve 22 which rotates about the crankshaft 12. The brake lever 52 is fixedly connected to the brake sleeve 22 in any suitable manner such as by welding or shrinking.

The upper portion of the brake lever 52 is provided with a hole 54 through which a pivot bolt 56 is inserted, pivotally connecting said brake lever 52 with a brake pusher rod 58. The pusher rod 58, at its opposite end, is fitted with a suitable shoe 60, said brake pusher rod 58 passing through a suitable bearing 62 contained in the front portion of a rear cycle fender 64.

In this form the coaster brake consists of a driving sleeve 24 and a braking sleeve 22 in coaxial alignment, rotatable about the crankshaft 12 and bridged by a helical wound coil spring 28. The spring 28 is not fastened to either sleeve 22 or 24, but its central portion is rigidly anchored to the center of the crankshaft 12 by suitable means.

One such way of fastening, shown in Fig. 1, is to anchor the spring 28 at its midpoint to the crankshaft 12 by positioning it over a raised knurled portion 30 on the crankshaft 12, that portion having a greater diameter than the inside diameter of the spring 28. To further secure the central portion of the spring 28 on shaft 12, I have positioned over its central portion a sleeve 32 having two annular crimps 34.

The operation depends upon radial force combined with the coefficient of friction between the spring 28 and the drive and brake sleeves 24 and 22. The necessary radial force is developed by manufacturing the spring 28 to an inside diameter smaller than the outside diameter of the sleeves 22 and 24. When the spring 28 is mounted, it has "diametral squeeze." The diametral squeeze and the coefficient of friction cause the spring wire to grip the sleeves 22 and 24.

In the operation of this embodiment, as the driving force is applied through the pedals to the pedal arms 16, the crankshaft 12 rotates in the driving direction. The raised central portion 18 of crankshaft 12, having a diameter slightly greater than the inner diameter of the right hand wound coil spring 28, exerts a radial force combined with friction on the inside surface of the spring 28. The spring 28 tends to coil more tightly and increases its prehensile grip on the drive sleeve 24, causing the integrally attached sprocket 44 to turn. This transmits driving power to a sprocket wheel 48 located at the hub of the rear wheel 50 by a common sprocket chain 46 that travels over both the drive sleeve sprocket 44 and the rear sprocket wheel 48.

During the drive motion, while the drive end of the spring 28 exerts its prehensile grip on the drive sleeve 24, the braking end of the coil spring 28 expands in diameter and overrides the brake sleeve 22, hence there is no accompanying braking action.

When coasting, the crankshaft 12 does not turn, hence no torque is transmitted to the drive sleeve 24, nor is any transmitted to the brake sleeve 22. The drive sprocket 44 turns, receiving its direction from the rear wheel sprocket 48 through their common sprocket chain 46. The drive end of the coil spring 28 does not in any way interfere with the free rotation of the drive sleeve 24. The coil spring 28 merely expands due to the direction of its wound coils, and overrides the drive sleeve 24.

In the application of the brakes, it is necessary to back pedal, or rotate the crankshaft 12 backwards. This causes the raised central portion 18 of the crankshaft 12 to engage the inner surface of the spring 28. Since the inside diameter of the spring 28 is less than the outside diameter of the brake sleeve 22, the spring 28 engages the brake sleeve 22 in prehensile grasp and transmits the torque of the crankshaft 12 to the brake sleeve 22, and through the brake sleeve 22 to the brake lever 52 and to the brake pusher rod 58, bringing the brake shoe 60 directly in contact with the rear wheel tire 54.

While the brake force is being applied, the opposite or drive end of the spring 28 tends to uncoil or enlarge its diameter, to override the drive sleeve 24 and render it inoperative. It can thus be seen that the brake application is fully operative even if the sprocket drive chain 46 should become severed or leave the sprocket 44. This is especially important when operating the bicycle on an inclined roadway.

In a modified form as shown in Fig. 3 this coaster brake may be used on standard full size bicycles, wherein a caliper type brake, shown in Fig. 6, having a pair of brake shoes 66, acts against the sides of the rim portion 68 of the rear wheel 50. The brake lever 52, in that embodiment, exerts a pulling force upon the brake cable, which in turn causes a pair of pivotally joined caliper brake shoes 66 to frictionally engage the sides of the wheel rim 68 to slow down or stop the bicycle.

When rolling the bicycle backwards, the drive sprocket 44 and its integrally attached drive sleeve 24, rotate backwards. Normally this rotation would tend to engage the brake sleeve 22 thereby rotating the crankshaft 12 backwards, resulting in setting the brake and preventing the bicycle from being backed up any further.

To prevent this action, the last few coils 42 at the drive end of the spring 28 are expanded so that their outside diameters are slightly greater than the inside diameter of the stationary housing 36. This causes a slight friction between the outside surface of the coil spring 26 and the inner surface of the stationary housing 36, sufficient to urge these few end coils 42 into inaction by overriding the drive sleeve 24, hence leaving the crankshaft 12 idle and unaffected. Since the brake is applied by back pedaling or reverse rotation of the crankshaft 12 only, no brake application results.

Figure 2:
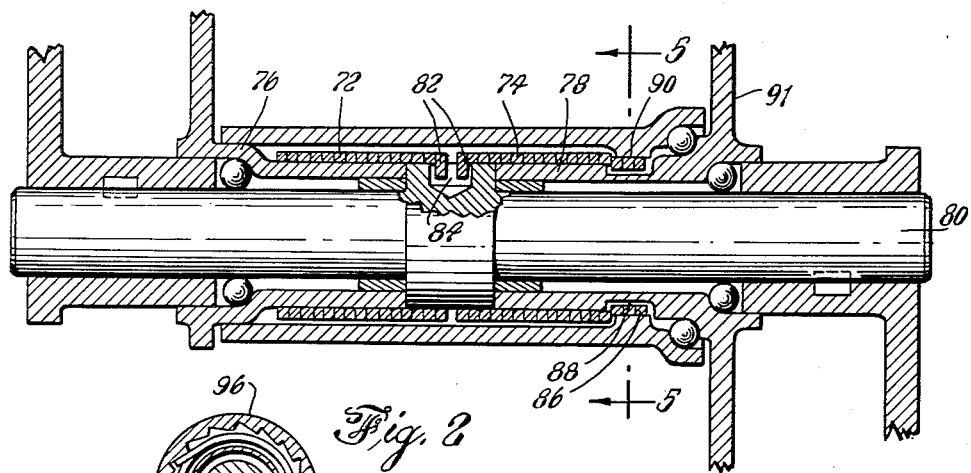
Fig. 2 is a longitudinal sectional view of another embodiment of our invention employing two right hand wound springs.

In a modified form of the invention, Fig. 2 shows how two right hand wound helical coil springs 72 and 74 may be used, one spring 74 having a prehensile grasp on the drive sleeve 78 and the other a similar grasp upon the brake sleeve 76 respectively. The springs 72 and 74 are not fastened to either sleeve but they are rigidly anchored to a crankshaft 80 by suitable means. One such way of fastening, shown in Fig. 2, is to anchor the toes 82 of the separate springs 72 and 74 to a recess 84 in the crankshaft 80.

In this modified form, the drive spring 74 has a few end coils 86 compressed inward into the sleeve neck 88 by a bearing step 90. These squeezed coils 86 of smaller diameter tend to expand upon backward rotation of the spring 74, when the bicycle is being backed up. The friction thus created between the outer surface of the end coils 86 and the projecting bearing step 90 unwinds the inner spring surface away from the drive sleeve 78. In this manner, the drive sleeve 78 and sprocket 91 are permitted to rotate backwards without rotating the crankshaft 80 or applying the brake.

Figure 5:
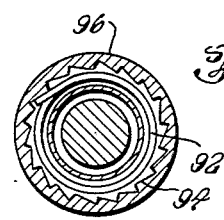
Fig. 5 is a sectional side elevation of an alternate form of back-up release that may be used with the embodiment shown in Fig. 2, taken on line 5—5 of Fig. 2.

Another method of back-up release is shown in Fig. 5. Here the free end of the drive spring 92 engages a serrated surface 94 of the stationary tube 96. The action during back-up of the bicycle is similar to that of compressed end coils described above.

Still a further modified form of the invention, Fig. 3, shows the use of one coil spring 98, constructed of a heavier gauge material, to provide the features of forward propulsion, coasting, roll back, and brake application. In this form, the brake sleeve 111 is positioned with bearings 110, attached in crank hanger 10, as shown in Fig. 3. The inner end 100 of the spring 98 may be rigidly fastened to the crankshaft 102 by anchoring a toe end 104 into a recess 106 in the crankshaft 102. The diameter of the few end coils 113 of the spring 98 are expanded so that their outside diameters are slightly greater than the inside diameter of the brake sleeve 111.

The major central portion of the spring 98 is in sliding contact with the drive sleeve 114. The outer surface of the expanded end few coils 113 is in frictional contact with the inside of the brake sleeve.

When spring 98 is rotated in a direction with respect to sleeve 111 such that the friction between the expanded few end coils 113 and sleeve 111 tends to unwind the spring, the remaining few coils of the spring 98 are thus caused to expand until the outer surface of the entire spring 98 firmly engages the inner wall of sleeve 111 thereby overriding the drive sleeve 114.

As the crankshaft 102 is rotated in a forward direction as in pedaling, the spring 98 engages the drive sleeve 114 in prehensile grasp, transmitting the torque of the crankshaft 102 to the drive sleeve 114, causing the integrally attached sprocket 115 to turn.

The sprocket 115 transmits power to the sprocket within the hub of the rear wheel by use of an endless sprocket chain traveling over both sprockets.

When the crankshaft 102 is rotated backwards for application of the brake, the spring 98 will uncoil and expand, until the outer surfaces of all its coils are in frictional contact with the inner wall of the brake sleeve 111. As the spring 98 reaches its maximum expansion, any additional backward rotation of the crankshaft 102, will cause backward rotation of the brake sleeve 111.

The brake sleeve 111 thus transmits the braking torque to the brake arm 112 which is integrally attached to the brake sleeve. Fig. 6 indicates the linkage 67 through which the braking action may be transmitted to a caliper type brake 66.

This modified form drive and coaster device may be used on full size bicycles. The coil spring 98 in this particular modification will of necessity have a fewer number of coils than the required by the unit shown in Fig. 1. Consequently, space is available for the use of spring material of a heavier gauge. The resulting increase in the strength of such heavier gauge spring would permit propulsion of an adult size bicycle with a coaster brake drive of this form.

It will be apparent to one skilled in the art that while we have shown the operation of a coaster brake employing a right hand wound coil spring, the device would be equally operative using a left hand wound coil spring. However in the latter case, the sprocket and its associated members would be positioned opposite to their present location in relation to the crankshaft.

Although the illustration of this invention shows its application to a crank hanger of a bicycle, it may be positioned in a rear wheel hub of a bicycle, in a front wheel hub of a tricycle or in other mechanisms requiring a clutch type operation.

In all of its applications, one stationary member or stator, and three rotating members or rotors are required, all being in axial alignment. These members are functional equivalents of the crank hanger, crankshaft, drive sleeve and brake sleeve.

The relative positioning, in a bicycle or tricyle, of the stator and the rotors will vary, depending upon the particular application. For example, when mounted in the front wheel of a tricycle, the wheel fork is the stator; the rotors being the crankshaft, drive sleeve and brake sleeve.

In the absence of motive power supplied to the drive member, the driven member is free to rotate in either direction without causing the drive member to rotate.

The invention hereinabove described may be varied in construction within the scope of the claims, for the particular device selected to illustrate the invention is but one of the many possible embodiments of the same. The invention, therefore, is not to be restricted to the precise details of the structure shown and described.

What is claimed is:

1. A pedal operated drive and brake comprising a stationary housing, a crank shaft, a sprocket drive sleeve and a brake sleeve positioned in concentric relation between said stationary housing and said crank shaft, and a helical coil spring fixed to said crankshaft and having a free portion which has a prehensile grasp upon the drive sleeve to frictionally engage both said sprocket drive sleeve and brake sleeve to drive one or the other depending on the direction of rotation the crank shaft is driven.

2. A pedal operated drive and brake comprising a fixed hub, a pedal operated crank shaft, a sprocket drive sleeve and a brake sleeve positioned in concentric relation between said stationary housing and said crank shaft, a helical coil spring fixed to said crank shaft and having a free portion which has a prehensile grasp upon the drive sleeve to frictionally engage said sprocket drive sleeve and brake sleeve to drive one or the other depending on the direction of rotation the crank shaft is driven, and one end of said coil spring having an increased diameter to urge said end coils to override said crank shaft on reverse motion of said crank shaft.

3. A pedal operated drive and brake comprising a stationary housing, a pedal operated crank shaft positioned through said stationary housing, and an enlarged diameter bearing surface at the midpoint of said crank shaft, a sprocket drive sleeve and a brake sleeve positioned in concentric relation between said stationary housing and said crank shaft, a sprocket wheel suitably attached to and in axial alignment with said drive sleeve, and a helical coil spring fixed to said crank shaft and having a free portion which has a prehensile grasp upon the drive sleeve to frictionally engage both said sprocket drive sleeve and brake sleeve to drive one or the other depending on the direction of rotation the crank shaft is driven.

4. A pedal operated drive and brake comprising a support, a crank shaft operable through said support, an enlarged diameter bearing surface on said crank shaft, a sprocket drive sleeve and a brake sleeve positioned in concentric relation on said crank shaft, a brake lever suitably attached to said brake sleeve, a helical coil spring fixed to said crank shaft and having a free portion which has a prehensile grasp upon the drive sleeve coiled about said sprocket drive sleeve at one end and about said brake sleeve at the other end in frictional contact with both sleeves to drive one or the other depending on the direction of rotation the crank shaft is driven.

5. A drive and brake comprising a crank hanger containing a rigidly mounted stationary housing, a crank shaft positioned through said stationary housing, a raised central portion on said crank shaft, a sprocket drive sleeve and a brake sleeve positioned in concentric relation between said stationary housing and said crank shaft, a sprocket wheel integrally attached to and in axial alignment with said drive sleeve, a helical coil spring fixed to said crank shaft and having a free portion which has a prehensile grasp upon the drive sleeve coiled about said sprocket drive sleeve at one end and about said brake sleeve at the other end in frictional contact with both sleeves, attaching means between the center portion of said spring and the raised central portion of said crank shaft anchoring said spring to said central portion of said crank shaft to drive said sprocket drive sleeve or the brake sleeve depending on the direction of rotation the crank shaft is driven.

6. A pedal operated drive and coaster brake comprising a rigidly mounted stationary housing, a crank shaft positioned through said housing, an enlarged diameter bearing surface on said crank shaft, a sprocket drive sleeve and a brake sleeve positioned in concentric relation between said stationary housing and said crank shaft, a helical coil spring fixed to said crank shaft and having a free portion which has a prehensile grasp upon the drive sleeve coiled about said sprocket sleeve at one end and about said brake sleeve at the other end in frictional contact with both sleeves, a sleeve tube having a pair of circumferential crimps interposed between the helical coil spring and the stationary housing, said drive sleeve and said brake sleeve to drive one or the other depending on the direction of rotation the crank shaft is driven.

7. A pedal operated drive and brake comprising a bicycle crank hanger containing a rigidly mounted stationary housing, a crank shaft positioned through said stationary housing, an enlarged diameter bearing surface on said crank shaft, said enlarged diameter bearing surface having a knurled area, a sprocket drive sleeve and a brake sleeve positioned in concentric relation between said stationary housing and said crank shaft, a coil spring fixed to said crank shaft and having a free portion which has a prehensile grasp upon the drive sleeve coiled about said sprocket sleeve at one end and about said brake sleeve at the other end in frictional contact with both sleeves to drive one or the other depending on the direction of rotation the crank shaft is driven.

8. A pedal operated drive and coaster brake comprising a stationary housing, a pedal operated crank shaft operable within said housing, a sprocket drive sleeve and a brake sleeve in axial relationship with said drive sleeve, said brake sleeve and said crank shaft, and a single helical coil spring fixed to said crank shaft and having a free portion which has a prehensile grasp upon the drive sleeve having a prehensile grasp over said drive sleeve at one end and over said brake sleeve at the other end to drive one or the other depending on the direction of rotation the crank shaft is driven.

9. A driving, coasting and braking apparatus comprising, a support, a rotatable shaft mounted in said support capable of being driven at different directions at different times, a sprocket drive sleeve and a brake sleeve positioned in concentric relationship and extending in opposite directions from the center of said shaft, spring means attached to the center of said shaft and coiled about said sprocket drive sleeve at one end and about said brake sleeve at the opposite end in frictional prehensile contact with both sleeves to drive one or the other depending on the direction of rotation the crank shaft is driven.

10. A pedal operated bicycle driving, braking and coasting device comprising a bearing tube rigidly mounted in the crank hanger of a bicycle frame, a pedal operated crank shaft positioned within said bearing tube, a drive sleeve and a brake sleeve in concentric relation between said bearing tube and said crank shaft, a drive spring having a prehensile grasp upon said drive sleeve, and a brake spring engaging the brake sleeve in prehensile grasp, the drive spring adapted to deliver forward propelling torque from the crank shaft to the drive sleeve and to override said sleeve upon reverse motion of the crank shaft, the brake spring adapted to deliver braking torque from the crank shaft to the brake sleeve.

11. A pedal operated bicycle driving, braking and coasting device comprising a bearing tube rigidly mounted in the crank hanger of a bicycle frame, a pedal operated crank shaft positioned within said bearing tube, a drive sleeve and a brake sleeve in concentric relation between said bearing tube and said crank shaft, a drive spring fixed to said crankshaft and having a free portion which has a prehensile grasp upon the drive sleeve, a brake spring fixed to said crankshaft and having a free portion which has a prehensile grasp upon the brake sleeve, and a surface within the drive sleeve of the bearing tube to engage the free end of the drive spring and compel it to override the drive sleeve when said drive sleeve is driven in reverse by the reverse movement of the bicycle.

12. A pedal operated drive and brake comprising a support a crankshaft operable through said support, a sprocket drive sleeve and a brake sleeve positioned in concentric relation between said support and said crank shaft, a prehensile helical coil spring to frictionally engage said drive and brake sleeves in a relationship responsive to rotation of said crank shaft, a brake lever integrally attached to said brake sleeve, a caliper brake cable attached to said brake lever, caliper brake shoes, positioned adjacent the rear wheel rim to engage in frictional contact with said wheel rim in response to a tension force exerted by said brake cable upon the application of said brake.

13. A pedal operated drive and brake comprising a stationary housing, a crankshaft operable through said stationary housing, a sprocket drive sleeve and a brake sleeve positioned in concentric relation between said stationary housing and said crank shaft, a prehensile helical coil spring to frictionally engage said drive and brake sleeves in a relationship responsive to the rotation of said crank shaft, a brake lever integrally attached to said brake sleeve, a brake pusher rod pivotally attached to said brake lever and supported at a point near its other end, and a brake shoe mounted at said other end adjacent the periphery of the rear wheel.

14. A pedal operated drive and brake comprising a stationary housing a crank shaft operable through said stationary housing, a drive sleeve and a brake sleeve positioned in concentric relation between said stationary housing and said crank shaft, a prehensile helical coil spring to frictionally engage said drive and brake sleeves in a relationship responsive to rotation of said crank shaft, a brake lever suitably joined to said brake sleeve and a sprocket wheel suitably joined to said drive sleeve.

References Cited in the file of this patent

UNITED STATES PATENTS

| 639,265 | Morris | Dec. 19, 1899 |
| 1,526,806 | Schurmann | Feb. 17, 1925 |